United States Patent [19]

Cooper et al.

[11] 4,224,209

[45] Sep. 23, 1980

[54] POLYPHENYLENE ETHER RESIN COMPOSITIONS CONTAINING POLY(ALKYLENE OXIDES) AND PHOSPHATE PLASTICIZER

[75] Inventors: Glenn D. Cooper; Arthur Katchman, both of Delmar, N.Y.

[73] Assignee: General Electric Company, Pittsfield, Mass.

[21] Appl. No.: 939,192

[22] Filed: Sep. 5, 1978

[51] Int. Cl.$^2$ ............................................. C08G 43/02
[52] U.S. Cl. ............................................. 260/30.6 R
[58] Field of Search ............... 260/830 R, 874, 30.6 R

[56] References Cited

U.S. PATENT DOCUMENTS

| 3,375,297 | 3/1968 | Barth | 260/830 R |
| 3,383,435 | 5/1968 | Cizek | 260/874 |
| 3,631,126 | 12/1971 | Snodgrass et al. | 260/830 R |
| 3,639,506 | 2/1972 | Haaf | 260/874 |
| 3,890,406 | 6/1975 | Matsuragan et al. | 260/874 |

FOREIGN PATENT DOCUMENTS 4638697  10/1968  Japan ........................................ 260/874

*Primary Examiner*—Joseph L. Schofer
*Assistant Examiner*—Peter F. Kulkosky
*Attorney, Agent, or Firm*—Morgan, Finnegan, Pine, Foley & Lee

[57] ABSTRACT

Novel compositions are disclosed which comprise a polyphenylene ether resin, a plasticizer, and a poly(alkylene oxide). Also disclosed are compositions comprised of a polyphenylene ether resin, a rubber-modified alkenyl aromatic resin, and a poly(alkylene oxide) as well as compositions comprised of a polyphenylene ether resin and an alkenyl aromatic resin modified with a poly(alkylene oxide). Included within the scope of this invention are corresponding reinforced and flame-retardant compositions.

44 Claims, No Drawings

POLYPHENYLENE ETHER RESIN COMPOSITIONS CONTAINING POLY(ALKYLENE OXIDES) AND PHOSPHATE PLASTICIZER

This invention relates to improved compositions of a polyphenylene ether resin containing a poly(alkylene oxide). Reinforced and flame-retardant compositions are also provided.

BACKGROUND OF THE INVENTION

The polyphenylene ether resins are a family of engineering thermoplastics that are well known to the polymer art. These polymers may be made by a variety of catalytic and non-catalytic processes from the corresponding phenols or reactive derivatives thereof. By way of illustration certain of the polyphenylene ethers are disclosed in Hay, U.S. Pat. Nos. 3,306,874 and 3,306,875, and in Stamatoff, U.S. Pat. Nos. 3,257,357 and 3,256,358. In the Hay patents, the polyphenylene ethers are prepared by an oxidative coupling reaction comprising passing any oxygen-containing gas through a reaction solution of a phenol and a metal-amine complex catalyst. Other disclosures relating to processes for preparing polyphenylene ether resins, including graft copolymers of polyphenylene ethers with styrene type compounds, are found in Fox, U.S. Pat. No. 3,356,761; Sumitomo, U.K. Pat. No. 1,291,609; Bussink et al., U.S. Pat. No. 3,337,892; Blanchard et al., Pat. No. 3,219,626; Laakso et al., Pat. No. 3,342,892; Borman, Pat. No. 3,344,116; Hori et al., Pat. No. 3,384,619; Faurote et al., Pat. No. 3,440,217; and Cooper et al., Pat. Nos. 3,661,848, 3,733,299, 3,383,102, and 3,988,297. Disclosures relating to metal based catalysts which do not include amines, are known from patents such as Wieden et al., U.S. Pat. No. 3,442,885 (copper-amidines); Nakashio et al., Pat. No. 3,573,257 (metal-alcholate or -phenolate); Kobyashi et al., Pat. No. 3,445,880 (cobalt chelates); and the like. In the Stamatoff patent, the polyphenylene ethers are produced by reacting the corresponding phenolate ion with an initiator, such as peroxy acid salt, an acid peroxide, a hypohalite, and the like, in the presence of a complexing agent. Disclosures relating to non-catalytic processes, such as oxidation with lead oxide, silver oxide, etc., are described in Price et al., U.S. Pat. No. 3,383,212. Cizek, Pat. No. 3,383,435 discloses polyphenylene ether-styrene resin compositions. All of the above-mentioned disclosures are incorporated by reference.

In the prior art, rubber-modified styrene resins have been admixed with polyphenylene ether resins to form compositions that have modified properties. The Cizek patent, U.S. Pat. No. 3,383,435, discloses rubber-modified styrene resin-polyphenylene ether resin compositions wherein the rubber component is of the unsaturated type such as polymers and copolymers of butadiene. The physical properties of these compositions are such that it appears that many of the properties of the styrene resins have been upgraded, while the moldability of the polyphenylene ethers are improved.

It has now been found that polyphenylene ether resin compositions containing poly(alkylene oxides) have improved impact strength and thermal oxidative stability.

It is, therefore, a primary object of this invention to provide improved compositions that are based on polyphenylene ether resins containing poly(alkylene oxides).

Another object of this invention is to provide molding compositions and molded articles that are based on a polyphenylene ether resin and a poly(alkylene oxide) and that overall have improved thermal oxidative stability.

Still another object of this invention is to provide molding compositions and molded articles that are based on a polyphenylene ether resin and a poly(alkylene oxide) and that have improved impact strength.

It is also an object of this invention to provide the above-described, improved molding compositions in reinforced and/or flame-retardant embodiments.

DESCRIPTION OF THE INVENTION

The above-mentioned advantages and objects and others will be readily apparent to those skilled in the art by the following compositions.

The compositions of this invention are comprised of:
(a) a polyphenylene ether resin;
(b) a plasticizer; and
(c) a poly(alkylene oxide)

The compositions of this invention are also comprised of:
(a) a polyphenylene ether resin;
(b) a rubber-modified alkenyl aromatic resin; and
(c) a poly(alkylene oxide)

The compositions of this invention are further comprised of:
(a) a polyphenylene ether resin; and
(b) an alkenyl aromatic resin modified with a poly(alkylene oxide).

The preferred polyphenylene ethers are of the formula

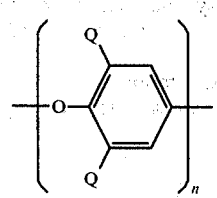

wherein the oxygen ether atom of one unit is connected to the benzene nucleus of the next adjoining unit, n is a positive integer and is at least 50, and each Q is a monovalent substituent selected from the group consisting of hydrogen, halogen, hydrocarbon radicals free of a tertiary alpha-carbon atom, halohydrocarbon radicals having at least two carbon atoms between the halogen atom and the phenyl nucleus, hydrocarbonoxy radicals, and halohydrocarbonoxy radicals having at least two carbon atoms between the halogen atom and the phenyl nucleus.

Examples of polyphenylene ethers corresponding to the above formula can be found in the above-referenced patents of Hay and Stamatoff. Especially preferred is poly(2,6-dimethyl-1,4-phenylene) ether.

The useful poly(alkylene oxides) are copolymers of propylene oxide and allyl glycidyl ether. The preferred poly(alkylene oxides) are comprised of units having the structures

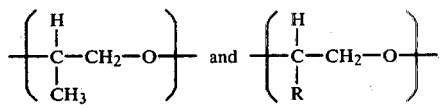

wherein R is —O—CH$_2$—CH=CH. A preferred poly(alkylene oxide) is Parel 58, available from Hercules Chemical Co., in which .7 percent of the units are derived from allyl glycidyl ether.

Many plasticizers known to those skilled in the art are useful in this invention. Preferred plasticizers are triaryl phosphates. Especially preferred are triphenyl phosphate, trixylyl phosphate, and tert-butylphenyl diphenyl phosphate. The plasticizer may also function as a flame-retardant.

The alkenyl aromatic resin should have at least 35% of its units derived from an alkenyl aromatic monomer of the formula

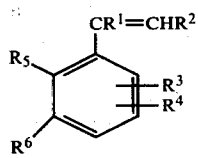

wherein $R^1$ and $R^2$ are selected from the group consisting of hydrogen and lower alkyl or alkenyl groups of from 1 to 6 carbon atoms; $R^3$ and $R^4$ are selected from the group consisting of chloro, bromo, hydrogen, and lower alkyl groups of from 1 to 6 carbon atoms; and $R^5$ and $R^6$ are selected from the group consisting of hydrogen and lower alkyl and alkenyl groups of from 1 to 6 carbon atoms or $R^5$ and $R^6$ may be concatenated together with hydrocarbyl groups to form a naphthyl group.

Specific examples of alkenyl aromatic monomer include sytrene, bromosytrene, chlorostyrene, α-methylstyrene, vinylxylene, divinylbenzene, vinyl naphthalene, and vinyl-toluene.

The alkenyl aromatic monomer may be copolymerized with materials such as these having the general formula

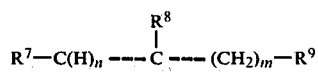

wherein the dotted lines each represent a single or a double carbon to carbon bond; $R^7$ and $R^8$ taken together represent a

linkage; $R^9$ is selected from the group consisting of hydrogen, vinyl, alkyl of from 1 to 12 carbon atoms, alkenyl of from 1 to 12 carbon atoms, alkylcarboxylic acid of from 1 to carbon atoms, and alkenylcarboxylic acid of from 1 to 12 carbon atoms; n is 1 or 2, depending on the position of the carbon-carbon double bond; and m is an integer of from 0 to about 10. Examples include maleic anhydride, citraconic anhydride, itaconic anhydride, aconitic anhydride, and the like.

The alkenyl resins include, by way of example, homopolymers such as homopolystyrene and poly(chlorostyrene), and styrene-containing copolymers, such as styrene-chlorostyrene copolymers, styrene-bromostyrene copolymers, the styrene acrylonitrile-α-alkyl styrene copolymers, styrene-acrylonitrile copolymers, styrene butadiene copolymers, styrene-acrylonitrile butadiene copolymers, poly-α-methylstyrene, copolymers of ethylvinylbenzene, divinylbenzene, and styrene maleic anhydride copolymers, and block copolymers of styrene butadiene and styrene-butadiene styrene.

The styrene-maleic anhydride copolymers are described in U.S. Pat. Nos. 2,971,939, 3,336,267, and 2,769,804, all of which are incorporated herein by reference.

The alkenyl aromatic resin can be modified with rubbers. Among the rubbers which can be employed are natural and synthetic elastomers, such as diene rubbers, e.g., polybutadiene, polyisoprene, and the like. Moreover, the rubbers can comprise random, block, and interpolymers of conventional types, e.g., butadiene-styrene random copolymers and styrene-butadiene-styrene block copolymers.

The alkenyl aromatic resins are modified with a rubber or a poly(alkylene oxide) by polymerizing the alkenyl aromatic momomer in the presence of the rubber or poly(alkylene oxide).

The components of the compositions of this invention are combinable in a fairly wide range of proportions. Preferably, compositions comprised of a polyphenylene ether resin, a plasticizer, and a poly(alkylene oxide) will comprise from about 20 to 90 parts by weight of polyphenylene ether resin, from about 2 to 50 parts by weight of plasticizer, and from about 1 to 40 parts by weight of poly(alkylene oxide), based on the total weight of the composition. Compositions comprised of a polyphenylene ether resin, a rubber-modified alkenyl aromatic resin, and a poly(alkylene oxide) will preferably be comprised from about 10 to 90 parts by weight of polyphenylene ether resin, from about 90 to 10 parts by weight of rubber-modified alkenyl aromatic resin, and from about 1 to 50 parts by weight of poly(alkylene oxide) based on the total weight of the composition. Compositions comprised of a polyphenylene ether resin and a poly(alkylene oxide) modified alkenyl aromatic resin will preferably comprise from about 10 to 99 parts by weight of polyphenylene ether resin and from about 1 to 90 parts by weight of poly(alkylene oxide) modified alkenyl aromatic resin, based on the weight of the total composition.

The modified alkenyl aromatic resins can contain from about 4 to 25% of rubber or poly(alkylene oxide) as modifier.

The compositions of the invention can also include other ingredients, such as flame retardants, extenders, processing aids, pigments, stabilizers, fillers such as mineral fillers and glass flakes and fibers, and the like. In particular, reinforcing fillers, in amounts sufficient to impart reinforcement, can be used, e.g., aluminum, iron or nickel, and the like, and non-metals, e.g., carbon filaments, silicates, such as acicular calcium silicate, asbestos, titanium dioxide, potassium titanate and titanate whiskers, glass flakes and fibers, and the like. It is to be undetstood that, unless the filler adds to the strength and stiffness of the composition, it is only a filler and not a reinforcing filler as contemplated herein. In particular, the reinforcing fillers increase the flexural strength, the flexural modulus, the tensile strength and the heat distortion temperature.

Although it is only necessary to have at least a reinforcing amount of the reinforcement present, in general, the combination of components (a), (b), and (c) or (a) and (b) will comprise from about 10 to about 90 parts by weight and the filler will comprise from about 10 to about 90 parts by weight of the total composition.

In particular, the preferred reinforcing fillers are of glass, and it is preferred to use fibrous glass filaments comprised of lime-aluminum borosilicate glass that is relatively soda free. This is known as "E" glass. However, other glasses are useful where electrical properties are not so important, e.g., the low soda glass known as "C" glass. The filaments are made by standard processes, e.g., by steam or air blowing, by flame blowing, or by mechanical pulling. The preferred filaments for plastics reinforcement are made by mechanical pulling. The filament diameters range from about 0.000112 to 0.00075 inch, but this is not critical to the present invention.

In general, the best properties will be obtained if the sized filamentous glass reinforcement comprises from about 1 to about 80% by weight based on the combined weight of glass and polymers and preferably from about 10 to about 50% by weight. Especially preferably the glass will comprise from about 10 to about 40% by weight based on the combined weight of glass and resin. Generally, for direct molding use, up to about 60% of glass can be present without causing flow problems. However, it is useful also to prepare the compositions containing substantially greater quantities, e.g., up to 70 to 80% by weight of glass. These concentrates can then be custom blended with resin compositions that are not glass reinforced to provide any desired glass content of a lower value.

The length of the glass filaments and whether or not they are bundled into fibers and the fibers bundled in turn to yarns, ropes or rovings, or woven into mats, and the like, are also not critical to the invention. However, in preparing the present compositions it is convenient to use the filamentous glass in the form of chopped strands of from about ⅛" to about 1" long, preferably less than ¼" long. In articles molded from the compositions, on the other hand, even shorter lengths will be encountered because, during compounding, considerable fragmentation will occur. This is desirable, however, because the best properties are exhibited by thermoplastic injection molded articles in which the filament lengths lie between about 0.005 and 0.125 inch.

Because it has been found that certain commonly used flammable sizings on the glass, e.g., dextrinized starch or synthetic polymers, contribute flammability often in greater proportion than expected from the amount present, it is preferred to use lightly sized or unsized glass reinforcements in those compositions of the present invention which are flame-retardant. Sizings, if present, can readily be removed by heat cleaning or other techniques well known to those skilled in the art.

It is also a feature of this invention to provide flame-retardant thermoplastic compositions, as defined above, by modifying the compositions to include a flame-retardant additive in a minor proportion but in an amount at least sufficient to render the compositions non-burning or self-extinguishing. The flame-retardant additives useful in this invention comprise a family of chemical compounds well known to those skilled in the art. Such flame-retardant additives include a halogenated organic compound, a halogenated organic compound in admixture with an antimony compound, elemental phosphorus, a phosphorus compound, compounds containing phosphorus-nitrogen bonds, or a mixture of two or more of the foregoing.

Among the helpful halogen-containing compounds are substituted benzenes exemplified by tetrabromobenzene, hexachlorobenzene, hexabromobenzene, and biphenyls such as 2,2'-dichlorobiphenyl, 2,4'-dibromobiphenyl, 2,4'-dichlorobiphenyl, hexabromobiphenyl, octabromobiphenyl, decabromobiphenyl, and halogenated diphenyl ethers containing from 2 to 10 halogen atoms.

The preferred halogen compounds for this invention are aromatic halogen compounds such as chlorinated benzene, brominated benzene, chlorinated biphenyl, chlorinated terphenyl, brominated biphenyl, brominated terphenyl, or a compound comprising two phenyl radicals separated by a divalent alkylene group and having at least two chlorine or bromine atoms per phenyl nucleus, or mixtures of at least two of the foregoing.

Especially preferred are the halogenated diphenyl ethers, such as decabromodiphenyl ether or hexabromodiphenyl ether, alone or mixed with antimony oxide.

The preferred phosphates are triaryl phosphates such as triphenyl phosphate, tert-butylphenyl diphenyl phosphate, trixylyl phosphate, and the like. It is also preferred to use a triaryl phosphate in combination with a halogenated diphenyl ether and, optionally, antimony oxide. Especially preferred is a composition comprised of mixed triaryl phosphates with one or more isopropyl groups on some or all of the aryl rings, such as Kronitex 50 supplied by Food Machinery Corporation.

Other flame-retardant additives are known to those skilled in the art. See, for example, Cooper et al., U.S. Pat. No. 3,943,191, incorporated herein by reference.

In general, however, the amount of additive will be from about 0.5 to 50 parts by weight per hundred parts of components (a), (b), and (c) or (a) and (b). A preferred range will be from about 1 to 25 parts, and an especially preferred range will be from about 3 to 15 parts of additive per hundred parts of (a), (b), and (c) or (a) and (b). Smaller amounts of compounds highly concentrated in the elements responsible for flame-retardance will be sufficient, e.g., elemental red phosphorus will be preferred at about 0.5 to 10 parts by weight per hundred parts of (a), (b), and (c) or (a) and (b), while phosphorus in the form of triphenyl phosphate will be used at about 3 to 25 parts of phosphate per hundred parts of (a), (b), and (c) or (a) and (b), and so forth. Halogenated aromatics will be used at about 2 to 20 parts and synergists, e.g., antimony oxide, will be used at about 1 to 10 parts by weight per hundred parts of components (a), (b), and (c) or (a) and (b).

The compositions of the invention may be formed by conventional techniques, that is, by first dry mixing the components to form a premix, and then passing the premix through an extruder at an elevated temperature, e.g., 425° to 640° F.

By way of illustration, glass roving (a bundle of strands of filaments) is chopped into small pieces, e.g., ⅛" to 1" in length, and preferably less than ¼" in length, and put into an extrusion compounder with (a) the polyphenylene ether resin, (b) the rubber-modified alkenyl aromatic resin, (c) poly(alkylene oxide), and (d) the flame-retardant additive(s), to produce molding pellets. The fibers are shortened and predispersed in the process, coming out at less than 1/16" long. In another procedure, glass filaments are ground or milled to short lengths, are mixed with the polyphenylene ether resin, the rubber-modified alkenyl aromatic polymer, the poly(alkylene oxide), and optionally, flame-retardant additive(s), by dry blending, and then are either fluxed on a mill and ground, or are extruded and chopped.

In addition, compounding should be carried out to insure that the residence time in the machine is short; that the temperature is carefully controlled; that the frictional heat is utilized; and that an intimate mixture between the resins and the additives is obtained.

DESCRIPTION OF THE PREFERRED EMBODIMENTS

The following examples are set forth as further illustration of the invention and are not to be construed as limiting the invention thereto.

EXAMPLE I

Seventy-seven grams of Parel 58 [a poly(alkylene oxide] and 700 g of poly(2,6-dimethyl-1,4-phenylene ether) (PPO) were dissolved in seven liters of toluene, and the solution was added slowly with vigorous stirring to approximately three gallons of methanol. The precipitated polymer, containing 90% PPO and 10% of Parel, 58, was filtered off, washed with methanol, and dried. Three hundred grams of the dried composition, 170 g of PPO, and 124 g of triphenyl phosphate were mixed and extruded in a 28 mm twin screw extruder to produce a composition which contained PPO and triphenyl phosphate in a ratio of 78:22, and which contained 5% by weight of Parel 58, based on the combined weight of PPO and TPP. A control composition, with the same ratio of PPO and TPP, but without the Parel 58, was similarly prepared, and both compositions were molded into standard test pieces by means of a 3 oz. Newbury screw injection molding machine.

Physical properties of the compositions were as follows:

| PROPERTY | CONTROL | WITH 5% PAREL 58 |
|---|---|---|
| Elongation (%) | 77 | 80 |
| Tensile Strength (psi) | 8,600 | 8,600 |
| Izod Impact (ft.lbs./in.) | 0.8 | 1.6 |
| Gardner Impact (in.lbs.) | 30 | 325 |
| Heat Distortion Temp. (°F.) | 188 | 203 |

The ductility of both compositions decreased sharply in 24 hours at 95° C.; both compositions had tensile elongation of 20% at this time, but after 126 days the composition containing Parel 58 was still ductile, with 20% elongation, while the control composition was brittle.

Therefore, the addition of poly(alkylene oxide) resulted in improved impact strength and improved thermal-oxidative stability.

EXAMPLE II

Three hundred and fifty grams of the 90:10 blend of PPO and Parel 58 described in Example I, 540 g of FG-834 rubber-modified polystyrene (available from Foster Grant), 4.5 g of tridecyl phosphite, 13.4 g of polyethylene, 62.3 of triphenyl phosphate, 1.3 g of zinc sulfide, and 1.3 g of zinc oxide were extruded and molded as described in Example I. A control composition containing the same ratio of the components but without the Parel 58 was prepared from 350 g of PPO, 650 g of FG-834 polystyrene, 5 g of tridecyl phosphite, 15 g of polyethylene, 70 g of triphenyl phosphate, 1.5 g of zinc sulfide, and 1.5 g of zinc oxide. The control composition had Izod impact strength of 5.6 g of ft.lbs./in., and the composition containing 4.1 phr of Parel 58 had Izod impact strength of 6.4 ft.lbs./in.

EXAMPLE III

One hundred grams of Parel 58 was dissolved in 900 g of styrene and the solution was transferred, along with 1.0 g of tert-butyl peracetate, to a one-gallon stainless steel reactor under nitrogen. The solution was stirred vigorously and heated for three hours at 100° C. The product was then suspended in 1500 ml of water containing 4.0 g of poly(vinyl alcohol) and 3.0 g of gelatin; 8.0 g of di-tert-butyl peroxide was added, and the polymerization was completed by heating the suspension for one hour at 100° C., for two hours at 120° C., for one hour at 140° C., and finally for two and one-half hours at 155° C. The beads of graft copolymer were filtered off, washed thoroughly with water, and dried.

Microscopic examination showed that the rubber particles in the product had diameters over the range of about one to five microns. The beads were extracted with methyl ethyl ketone, and the insoluble fraction was separated and dried. It contained 26.6% of MEK-insoluble gel; the percent graft, defined as $$100 \times \frac{\text{wt. of gel} - \text{wt. of rubber}}{\text{wt. of rubber}}$$

was 166%.

EXAMPLE IV

Fifty parts of PPO, 50 parts of the copolymer prepared in Example III, 3 parts of triphenyl phosphate, 1.5 parts of polyethylene, 0.15 parts of zinc sulfide and 0.15 parts of zinc oxide were mixed and extruded in a 28 mm twin-screw extruder. The extruded pellets were then molded into standard test pieces by means of a 3 oz. Newbury injection molding machine. For comparison a similar composition was prepared from 50 parts of PPO, 45 parts of Dylene 8G polystyrene homopolymer (available from Koppers Co., Inc.) and 5 parts of Parel 58. A third composition consisting of 50 parts of PPO and 50 parts of Dylene 8G polystyrene, was also prepared.

The composition comprised of PPO and polystyrene had Izod impact of 0.7 ft.lbs/in. notch; the composition prepared from PPO, Parel 58, and Dylene 8G an impact strength of 0.9 ft.lbs./in.; and the composition comprised of PPO and polystyrene—Parel graft copolymer had impact strength of 1.9 ft.lbs./in. of notch.

Therefore, the composition prepared according to this invention had impact strength greater than that of a mechanical mixture of PPO, poly(alkylene oxide), and polystyrene and greater than that of a composition of PPO and polystyrene.

EXAMPLE V

A composition comprised of 65 parts of PPO, 35 parts of the copolymer produced in Example III, 3 parts triphenyl phosphate, 1 part tridecyl phosphite, 1.5 parts polyethylene, 0.15 parts zinc sulfide, and 0.15 parts of zinc oxide was extruded and molded as described in Example IV. The material had the following properties:

tensile yield strength, 10,400 psi, elongation, 37%; Izod impact strength, 2.1 ft.lbs/in. of notch; gloss number (45°), 49; and heat distortion temperature 261° F.

It can be seen from the above that compositions of this invention have improved impact strength. They also demonstrate improved thermal-oxidative stability.

Obviously, other modifications and variations of the present invention are possible in the light of the above teachings. It is, therefore, to be understood that changes may be made in the particular embodiments described above which are within the full intended scope of the invention as defined in the appended claims.

We claim:

1. A thermoplastic molding composition which, after molding, has a good impact strength, said composition comprising:
   (a) a polyphenylene ether resin;
   (b) a plasticizer; and
   (c) a copolymer of alkylene oxide and alkyl glycidyl ether.

2. The molding composition of claim 1 wherein the polyphenylene ether resin is selected from the compounds of the formula

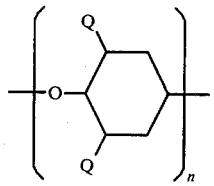

wherein the oxygen ether atom of one unit is connected to the benzene nucleus of the next adjoining unit, n is a positive integer and is at least 50, and each Q is a monovalent substituent selected from the group consisting of hydrogen, halogen, hydrocarbon radicals free of a tertiary alpha-carbon atom, halohydrocarbon radicals having at least two carbon atoms between the halogen atom and the phenyl nucleus, hydrocarbonoxy radicals, and the halohydrocarbonoxy radicals having at least two carbon atoms between the halogen atom and the phenyl nucleus.

3. The molding composition of claim 1 wherein the plasticizer is a triaryl phosphate.

4. The molding composition of claim 3 wherein the plasticizer is triphenyl phosphate, trixylyl phosphate, or tertbutylphenyl diphenyl phosphate.

5. The molding composition of claim 3 wherein the plasticizer is a mixture of triaryl phosphates wherein one or more aryl groups are substituted by one or more isopropyl groups.

6. The molding composition of claim 1 wherein the poly(alkylene oxide) is a rubbery copolymer of propylene oxide and allyl glycidyl ether comprised of units having the structure

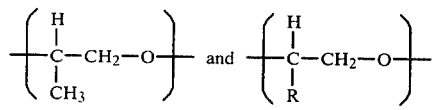

wherein R is —O—CH$_2$—CH=CH

7. The molding composition of claim 1 wherein the composition includes a reinforcing amount of an inorganic reinforcing filler.

8. The molding composition of claim 7 wherein the composition includes 10–80% by weight of fibrous glass filaments, based on the total weight of the composition.

9. The molding composition of claim 1 wherein the composition includes a flame-retardant amount of a flame-retardant additive.

10. A thermoplastic molding composition which, after molding, has good impact strength, said composition comprising:
    (a) from about 20 to 90 parts by weight of a polyphenylene ether resin;
    (b) from about 2 to 50 parts by weight of a plasticizer; and
    (c) from about 1 to 40 parts by weight of a copolymer of alkylene oxide and alkyl glycidyl ether, based on the total weight of the composition.

11. The molding composition of claim 10 wherein the polyphenylene ether resin is poly(2,6-dimethyl-1,4-phenylene) ether.

12. The molding composition of claim 11 wherein the plasticizer is a triaryl phosphate.

13. The molding composition of claim 11 wherein the plasticizer is triphenyl phosphate, trixylyl phosphate, or tertbutylphenyl diphenyl phosphate.

14. The molding composition of claim 10 wherein the plasticizer is a mixture of triaryl phosphates wherein one or more aryl groups are substituted by one or more isopropyl groups.

15. A thermoplastic molding composition which, after molding, has good impact strength, said composition comprising:
    (a) from about 20 to 90 parts by weight of a polyphenylene ether resin;
    (b) from about 2 to 50 parts by weight of a plasticizer;
    (c) from about 1 to 40 parts by weight of a copolymer of alkylene oxide and alkyl glycidyl ether, based on the total weight of the composition; and
    (d) a reinforcing amount of an inorganic reinforcing filler.

16. The molding composition of claim 15 wherein the polyphenylene ether resin is poly(2,6-dimethyl-1,4-phenylene) ether.

17. The molding composition of claim 15 wherein the plasticizer is a triaryl phosphate.

18. The molding composition of claim 17 wherein the plasticizer is triphenyl phosphate, trixylyl phosphate, or tertbutylphenyl diphenyl phosphate.

19. The molding composition of claim 17 wherein the plasticizer is a mixture of triaryl phosphates wherein one or more aryl groups are substituted by one or more isopropyl groups.

20. The molding composition of claim 15 wherein the reinforcing filler comprises from 10 to 80% of fibrous glass filaments, based on the total weight of the composition.

21. A thermoplastic molding composition which, after molding, has good impact strength, said composition comprising:
    (a) from about 20 to 90 parts by weight of polyphenylene ether resin;
    (b) from about 2 to 50 parts by weight of a plasticizer;
    (c) from about 1 to 40 parts by weight of a copolymer of alkylene oxide and alkyl glycidyl ether, based on the total weight of the composition; and
    (d) a flame-retardant amount of a flame-retardant additive.

22. The molding composition of claim 21 wherein the flame-retardant additive is a halogenated organic compound, a halogenated organic compound in admixture with an antimony compound, elemental phosphorus, a phosphorus compound, compounds containing phosphorus-nitrogen bonds, or a mixture of two or more of the foregoing.

23. The molding composition of claim 21 wherein the flame-retardant additive comprises a mixture of an organic bromine-containing compound with antimony oxide.

24. The molding composition of claim 21 wherein the flame-retardant additive is triphenyl phosphate, trixlyl phosphate, or tert-butylphenyl diphenyl phosphate.

25. The molding composition of claim 21 wherein the flame-retardant additive is comprised of a mixture of triaryl phosphates wherein one or more aryl groups are substituted by one or more isopropyl groups.

26. A thermoplastic molding composition which, after molding, has good impact strength, said composition comprising:
   (a) a polyphenylene ether resin;
   (b) a rubber-modified alkenyl aromatic resin; and
   (c) a copolymer of alkylene oxide and alkyl glycidyl ether.

27. The molding composition of claim 26 wherein the polyphenylene ether resin is poly(2,6-dimethyl-1,4-phenylene) ether.

28. The molding composition of claim 26 wherein the alkenyl aromatic resin is prepared from a monomer selected from the group consisting of styrene, α-methylstyrene, bromostyrene, chlorostyrene, divinylbenzene, and vinyltoluene.

29. The molding composition of claim 26 wherein the alkenyl aromatic resin is modified with a rubbery polymer of butadiene.

30. The molding composition of claim 26 wherein the composition includes a reinforcing amount of an inorganic reinforcing filler.

31. The molding composition of claim 30 wherein the composition includes 10–80% by weight of fibrous glass filaments, based on the total weight of the composition.

32. The molding composition of claim 26 wherein the composition includes a flame-retardant amount of a flame-retardant additive.

33. The molding composition of claim 32 wherein the flame retardant is a halogenated organic compound, a halogenated organic compound in admixture with an antimony compound, elemental phosphorus, a phosphorus compound, compounds containing phosphorus-nitrogen bonds, or a mixture of two or more of the foregoing.

34. A thermoplastic molding composition which, after molding, has good impact strength, said composition comprising:
   (a) from about 10 to 90 parts by weight of a polyphenylene ether resin;
   (b) from about 10 to 90 parts by weight of a rubber-modified aromatic resin;
   (c) from about 1 to 50 parts by weight of a copolymer of alkylene oxide and alkyl glycidyl ether, based on the total weight of the composition.

35. The molding composition of claim 34 wherein the polyphenylene ether resin is poly(2,6-dimethyl-1,4-phenylene) ether.

36. The molding composition of claim 34 wherein the alkenyl aromatic resin is styrene and the rubber is present between about 4% and about 75% by weight of styrene and rubber combined.

37. A thermoplastic molding composition which, after molding, has good impact strength, said composition comprising:
   (a) from about 10 to 90 parts by weight of a polyphenylene ether resin;
   (b) from about 10 to 90 parts by weight of a rubber-modified aromatic resin;
   (c) from about 1 to 50 parts by weight of a copolymer of alkylene oxide and alkyl glycidyl ether, based on the total weight of the composition; and
   (d) a reinforcing amount of an inorganic reinforcing filler.

38. The molding composition of claim 37 wherein said polyphenylene ether resin is poly(2,6-dimethyl-1,4-phenylene) ether.

39. The molding composition of claim 37 wherein said reinforcing filler comprises from 10 to 80% of fibrous glass filaments, based on the total weight of the composition.

40. A thermoplastic molding composition which, after molding, has good impact strength, said composition comprising:
   (a) from about 10 to 90 parts by weight of a polyphenylene ether resin;
   (b) from about 10 to 90 parts by weight of a rubber-modified aromatic resin;
   (c) from about 1 to 50 parts by weight of a copolymer of alkylene oxide and alkyl glycidyl ether, based on the total weight of the composition; and
   (d) a flame-retardant amount of a flame-retardant additive.

41. The molding composition of claim 40 wherein the flame-retardant additive is a halogenated organic compound, a halogenated organic compound in admixture with an antimony compound, elemental phosphorus, a phosphorus compound, compounds containing phosphorus-nitrogen bonds, or a mixture of two or more of the foregoing.

42. The molding composition of claim 40 wherein the flame-retardant additive comprises a mixture of an organic bromine-containing compound with antimony oxide.

43. The molding composition of claim 40 wherein the flame-retardant additive is triphenyl phosphate, trixylyl phosphate, or tert-butylphenyl diphenyl phosphate.

44. The molding composition of claim 40 wherein the flame-retardant additive is comprised of a mixture of triaryl phosphates wherein one or more aryl groups are substituted by one or more isopropyl groups.

* * * * *

UNITED STATES PATENT AND TRADEMARK OFFICE
CERTIFICATE OF CORRECTION

PATENT NO. : 4,224,209
DATED : September 23, 1980
INVENTOR(S) : Glenn D. Cooper; Arthur Katchman It is certified that error appears in the above—identified patent and that said Letters Patent is hereby corrected as shown below:

In column 9, on line 19, after "and" and before "glycidyl" the word "alkyl" should be -- allyl --.

In column 9, from line 25 to line 33, the formula should be as follows:

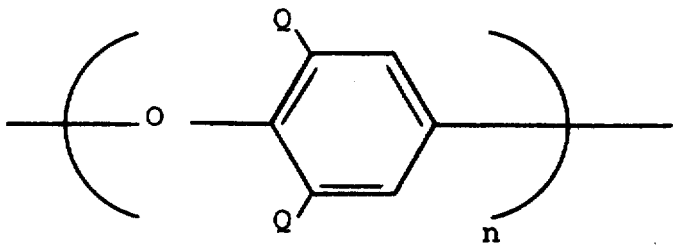

In column 10, on lines 15, 36 and 63, respectively, after "and" and before "glycidyl" the word "alkyl" should be -- allyl --.

UNITED STATES PATENT AND TRADEMARK OFFICE
CERTIFICATE OF CORRECTION

PATENT NO. : 4,224,209
DATED : September 23, 1980
INVENTOR(S) : Glenn D. Cooper; Arthur Katchman It is certified that error appears in the above—identified patent and that said Letters Patent is hereby corrected as shown below:

In column 11, on line 23, after "and" and before "glycidyl", the word "alkyl" should be -- allyl --.

In column 12, on lines 2, 19 and 38, respectively, after "and" and before "glycidyl" the word "alkyl" should be -- allyl --.

Signed and Sealed this

Twenty-first Day of February 1984

[SEAL]

Attest:

Attesting Officer

GERALD J. MOSSINGHOFF

Commissioner of Patents and Trademarks